Patented Nov. 30, 1926.

UNITED STATES PATENT OFFICE.

1,608,562

JOSEPH MELANDRI, OF LONDON, ENGLAND.

MANUFACTURE OF BUILDING BLOCKS, SLABS, FLOORS, CEILINGS, TILES, AND THE LIKE.

No Drawing. Application filed July 30, 1926, Serial No. 126,084, and in Great Britain May 29, 1925.

(GRANTED UNDER THE PROVISIONS OF THE ACT OF MARCH 3, 1921, 41 STAT. L., 1313.)

This invention relates to the manufacture of building blocks, slabs, floors, ceilings, tiles and the like from materials comprising mixtures of fibrous materials with cementitious materials containing lime or to which lime is added.

The invention has for its object to produce a material for this purpose from mixtures of saw-dust, peat or other fibrous materials with lime and Portland cement, Roman cement or other cementitious materials, wherein the fibrous material is rendered germ-free and the setting of the cementitious material is promoted by treatment with dilute sulphuric acid.

A further object of the invention is to provide such a material which can be moulded to any required shape when in a plastic condition and which when set will be light, easy to handle, durable and inexpensive, and which can be sawn or otherwise worked with tools.

The method of manufacture of building blocks or the like, according to this invention, consists in mixing a fibrous material with hydrated lime, incorporating the fibre-lime mixture with a cementitious material, bringing the mass to a plastic state by adding water containing a small proportion of sulphuric acid, and moulding the plastic mass into the required form. After moulding, the material is preferably immersed in a dilute solution of sulphuric acid.

The free acid remaining in the completely or partially set material may be removed by washing with water.

A small proportion of sand may be added to the said cementitious material, if desired, to act as a filler.

In one way of carrying the invention into effect, saw-dust, peat ground or otherwise prepared in a suitably fine condition or other fibrous material is first mixed with hydrated lime in suitable proportions, such as for example ten pounds of lime to sixty pounds of fibrous material. The admixed lime is hydrated to such a degree as to form a suspension which will ensure the uniform coating of the fibrous material with a layer of lime. The fibre-lime mixture thus formed is thoroughly incorporated with a cementitious material such as Portland cement in suitable proportions, such as for example twenty pounds of cement with sufficient fibre-lime mixture to produce a cubic foot of the mixed mass.

Water containing a small proportion of sulphuric acid, for example a dilute solution of one per cent sulphuric acid content, is then added whilst mixing and stirring, in sufficient quantity to bring the mixed mass to a plastic state. The plastic material is moulded into the required form, such as building blocks, slabs or tiles and treated preferably whilst in a plastic condition by immersion in a dilute sulphuric acid solution which is for example of about three per cent strength.

The period of immersion may vary but it is preferably short and of the order of about two or three minutes.

The action of the acid is inter alia to promote the setting of the cement in the mixture by conversion of the lime therein into insoluble calcium sulphate, the crystals of the said calcium sulphate interlocking to form an efficient binding material for the saw-dust or other fibrous material.

When the material is partially or thoroughly set the free acid remaining may if desired be removed by washing with water or by elutriation.

In some cases it may be thought advisable to add a small proportion of sand to the cementitious material to act as a filler and in these cases the proportions and procedure are substantially as hereinbefore described.

The finished product can be sawn like wood or worked with other tools in any convenient or required manner.

I claim:—

1. A method of manufacture of building blocks or the like consisting in mixing a fibrous material with hydrated lime, incorporating the fibre-lime mixture with a cementitious material, bringing the mass to a plastic state by adding water containing a small proportion of sulphuric acid, and moulding the plastic mass into the required form.

2. A method of manufacture of building blocks or the like consisting in mixing a fibrous material with hydrated lime, incorporation the fibre-lime mixture with a cementitious material, bringing the mass to a plastic state by adding water containing a small proportion of sulphuric acid, moulding the plastic mass into the required form and immersing the moulded material in a dilute solution of sulphuric acid.

3. A method of manufacture of building blocks or the like consisting in mixing a fibrous material with hydrated lime, incorporating the fibre-lime mixture with a cementitious material, bringing the mass to a plastic state by adding water containing a small proportion of sulphuric acid, moulding the plastic mass into the required form, immersing the moulded material in a dilute solution of sulphuric acid and removing the free acid remaining by washing with water.

4. A method of manufacture of building blocks or the like consisting in mixing a fibrous material with hydrated lime, incorporating the fibre-lime mixture with a cementitious material containing a small proportion of sand, bringing the mass to a plastic state by adding a dilute solution of sulphuric acid, moulding the plastic mass into the required form and immersing the moulded material in a dilute solution of sulphuric acid.

5. A method of manufacture of building blocks or the like consisting in mixing a fibrous material with hydrated lime, incorporating the fibre-lime mixture with a cementitious material containing a small proportion of sand, bringing the mass to a plastic state by adding a dilute solution of sulphuric acid, moulding the plastic mass into the required form, immersing the moulded material in a dilute solution of sulphuric acid and removing the free acid remaining by washing with water.

6. A method of manufacture of building block or the like consisting in mixing ten pounds of lime suspended in water with sixty pounds of fibrous material, incorporating the fibre-lime mixture with a cementitious material in the proportions of twenty pounds of cementitious material with sufficient fibre-lime mixture to produce a cubic foot of the mixed mass, bringing the mass to a plastic state by adding a one per cent solution of sulphuric acid, moulding the plastic mass into the required form and immersing the moulded material in a three per cent solution of sulphuric acid for from two to three minutes.

7. A method of manufacture of building blocks or the like consisting in mixing ten pounds of lime suspended in water with sixty pounds of fibrous material, incorporating the fibre-lime mixture with a cementitious material in the proportions of twenty pounds of cementitious material with sufficient fibre-lime mixture to produce a cubic foot of the mixed mass, bringing the mass to a plastic state by adding a one per cent solution of sulphuric acid, moulding the plastic mass into the required form, immersing the moulded material in a three per cent solution of sulphuric acid for from two to three minutes and removing the free acid remaining by washing with water.

8. A building block or the like produced by mixing a fibrous material with hydrated lime, incorporating the fibre-lime mixture with a cementitious material, bringing the mass to a plastic state by adding water containing a small proportion of sulphuric acid, moulding the plastic mass into the required form and immersing the moulded material in a dilute solution of sulphuric acid.

9. A building block or the like produced by mixing a fibrous material with hydrated lime, incorporating the fibre-lime mixture with a cementitious material, bringing the mass to a plastic state by adding water containing a small proportion of sulphuric acid, moulding the plastic mass into the required form, immersing the moulded material in a dilute solution of sulphuric acid and removing the free acid remaining by washing with water.

10. A material for building and like purposes produced by mixing a fibrous material with hydrated lime, incorporating the fibre-lime mixture with a Portland cement, bringing the mass to a plastic state by adding water containing a small proportion of sulphuric acid, moulding the plastic mass into the required shape and immersing the moulded material in a dilute solution of sulphuric acid.

11. A material for building and like purposes produced by mixing a fibrous material with hydrated lime, incorporating the fibre-lime mixture with a Portland cement, bringing the mass to a plastic state by adding water containing a small proportion of sulphuric acid, moulding the plastic mass into the required shape, immersing the moulded material in a dilute solution of sulphuric acid and removing the free acid remaining by washing with water.

In testimony whereof he has affixed his signature.

JOSEPH MELANDRI.